Patented July 20, 1954

2,684,382

UNITED STATES PATENT OFFICE 2,684,382

PROCESS OF SEPARATING ISOPHTHALIC AND TEREPHTHALIC ACIDS FROM MIXTURES THEREOF

William G. Toland, Jr., San Rafael, Calif., assignor to California Research Corporation, San Francisco, Calif., a corporation of Delaware No Drawing. Application October 17, 1952, Serial No. 315,405

10 Claims. (Cl. 260—525)

The present invention relates to the production of isophthalic acid, terephthalic acid, and enriched mixtures thereof, from crude mixtures of the acids.

Serious separation problems are encountered in the production of isophthalic acid, terephthalic acid and specific enriched mixtures thereof. The acids are very commonly produced in the form of crude mixtures by the oxidation of mixed meta- and para-xylenes because of the extreme difficulty of separating the isomeric xylenes due to their similar physical properties. Such crude isophthalic and terephthalic acid mixtures cannot be separated or enriched by conventional means. Fractional distillation is impractical since terephthalic acid has a tendency to sublime and isophthalic acid has such a high melting point that there is always danger of decomposition. Other methods such as fractional crystallization are also commonly considered unsatisfactory because of the generally similar physical properties of the acids. More roundabout methods of separating and enriching mixtures of the acids as by first converting them to their ester or salt derivatives have been attempted. These methods have also been unsatisfactory because of the similar boiling points of the esters and the generally high melting points of the salts. Furthermore, the formation of esters or salts in such separations has a great disadvantage in the consumption of valuable chemicals as reagents.

It has now been found that isophthalic acid, terephthalic acid and enriched mixtures thereof may be produced from mixtures of the acids by a process which comprises forming an intimate mixture of the acids to be separated or enriched with aqueous sulfuric acid having a concentration of at least 70 weight per cent, said mixture being at a temperature of at least 50° F., separating a solid phase consisting of purified terephthalic acid, or a terephthalic acid enriched mixture and a liquid phase consisting of an aqueous sulfuric acid solution of purified isophthalic acid or a isophthalic acid enriched mixture. The purified isophthalic acid or isophthalic acid enriched mixture may be crystallized from the liquid phase by cooling and/or diluting the liquid phase with water and separating a second solid phase consisting of the purified isophthalic acid or isophthalic acid enriched mixture.

In accordance with the process of this invention an "intimate mixture" of the acids to be separated is formed with the sulfuric acid. Such terminology is intended to mean mixtures of the isophthalic and terephthalic acids with aqueous sulfuric acid in intimate contact so that equilibrium exists between a liquid phase of aqueous sulfuric acid and dissolved phthalic acids and a solid phase of undissolved pure terephthalic acid or terephthalic acid enriched mixture. The "intimate mixtures" may be formed by mixing the solid phthalic acid mixtures with insufficient aqueous sulfuric acid to entirely dissolve them or the phthalic acid mixtures may be entirely dissolved in aqueous sulfuric acid and the resulting solution cooled to form an intimately mixed liquid and solid phase. The "enriched mixtures" of isophthalic and terephthalic acid produced in the process of the invention are mixtures of acids in which the ratio of isophthalic acid or terephthalic acid to other acids in the product has been increased beyond what it was in the starting mixture.

As already stated, the concentration of the aqueous sulfuric acid may be maintained at an approximately constant value and the separation of the second solid phase effected by cooling the solution to a lower temperature. This has the advantage of avoiding the need for reconcentrating the aqueous sulfuric acid or diverting it to other uses. On the other hand, where supplies of sulfuric acid are not a problem, it is sometimes desirable to employ approximately constant temperatures in the process and separate the second solid phase by diluting the aqueous sulfuric acid solution. A combination of both cooling and dilution has the advantage of avoiding excessive requirements of heating, cooling and reconcentrating equipment.

The process of this invention may be carried out at any practical temperature, or over any practical temperature range above 50° F. Room temperatures such as about 65–70° F. are particularly convenient when the concentration alone of the acid is varied. Effective separations may also be accomplished at either higher or lower temperatures. Higher temperatures (with pressure, if operating above the normal boiling point of a given strength of sulfuric acid) are for present purposes considered especially advantageous since more isophthalic acid may be held in solution by a given amount of sulfuric acid due to the increased solubility of isophthalic acid. Higher temperatures have a further advantage in that lower concentrations of sulfuric acid can be used to effect a separation. For present purposes temperatures in the range from about 65° F. to about 500° F. are preferred.

The concentration of the aqueous sulfuric acid, as stated above, is at least 70 per cent by weight and preferably at least 80 per cent. Concentrations in the range from about 85 to about 96 per cent are still more preferred.

In the preferred practice of the invention it is desirable to correlate the temperatures and the aqueous sulfuric acid concentrations. The lower concentrations of aqueous sulfuric acid are most effectively employed with the higher temperatures and, vice versa, the higher concentrations with the lower temperatures.

The production of isophthalic acid, terephthalic acid and specific enriched mixtures thereof in accordance with the process of this invention has several important advantages over previous methods. The solubilities of the isophthalic acid and terephthalic acid in the sulfuric acid at least 70% concentration are sufficiently different at temperatures of at least 50° F. to permit effective separation of the acids from their mixtures. Furthermore, there is a considerable saving in time and expense since it is unnecessary to convert the isophthalic and terephthalic acids to derivatives which are more easily separated on the basis of different physical properties and then reconvert them to the acids.

In the process of this invention the sulfuric acid having a concentration of at least 70% selectively dissolves the isophthalic acid from the mixture of isophthalic acid and terephthalic acid. The solid phases separated in the process as described above consist of purified terephthalic acid and isophthalic acid fractions which may be essentially pure terephthalic acid, essentially pure isophthalic acid, or specific enriched mixtures thereof. When the quantity of at least 70% sulfuric acid employed in the process is not only insufficient to dissolve all of the acids, but also insufficient to dissolve all of the more soluble isophthalic acid at the temperature of separation, the solid phase of the first separation is an enriched terephthalic acid mixture and the solid phase of the second separation is essentially pure isophthalic acid. When the amount of at least 70% sulfuric acid employed is insufficient to dissolve all of the acids, but is however sufficient to dissolve all of the isophthalic acid as well as part of the terephthalic acid, the solid phase of the first separation consists of essentially pure terephthalic acid and the solid phase of the second separation contains an enriched isophthalic acid mixture. When the sulfuric acid of at least 70% concentration is insufficient to dissolve all of the acids but just sufficient to form a saturated solution of all of the isophthalic acid, the solid phase of the first separation consists of essentially pure terephthalic acid and the solid phase of the second separation is essentially pure isophthalic acid.

In order to obtain practically complete recovery of the isophthalic acid in the second separation described above, the liquid phase from the first separation step is cooled and/or diluted at least down to a temperature and a sulfuric acid concentration at which isophthalic acid is substantially insoluble. Temperatures of from about 0° F. to about 500° F. and concentrations of from about 50% to about 100% by weight are particularly suitable, the lower temperatures being used for the higher concentrations and vice versa. Excessive cooling and/or dilution is undesirable, however, in cases where the isophthalic and terephthalic acid mixture is contaminated with other, more soluble, organic acids which begin to precipitate at the lower concentrations and temperatures.

The solid phases separated as described above ordinarily contain some adherent sulfuric acid solution. The amount of solution adhering to the purified terephthalic acid and isophthalic acid fractions is variable and depends upon the efficiency of the separation. In a powerful centrifuge, for example, the amount of sulfuric acid solution remaining in the separated solid phase is small. However, even this small amount of sulfuric acid solution must be removed if substantially pure terephthalic acid, isophthalic acid, or a specific enriched mixture thereof, is desired. For present purposes it has been found that such adherent sulfuric acid solutions may be conveniently removed by washing the solid phase with water.

The production of isophthalic acid, terephthalic acid and specific enriched mixtures thereof in accordance with the process of this invention is adaptable to any mixtures of the acids commonly to be encountered. The mixtures to be purified may contain isophthalic acid and terephthalic acid in any ratio. Mixtures containing in addition ortho-phthalic acid, benzoic acid, toluic acids, etc., such as may be obtained by the oxidation of natural crude xylenes, may also be purified. No change in the process is required because of these other, more soluble, organic acids which remain in the liquid phases throughout the two separation steps.

As already mentioned, the amount of sulfuric acid having a concentration of at least 70% employed in the initial separation of the process may be any quantity insufficient to dissolve all of the isophthalic and terephthalic acid mixtures to be separated when the solid and liquid phases have been brought into equilibrium as by intimate mixing. For economic reasons, the amount of aqueous sulfuric acid should be sufficient to form a saturated solution of a substantial portion of the isophthalic acid present in the starting phthalic acid mixture. The ratio of aqueous sulfuric acid to phthalic acid mixture, on a weight basis, ordinarily should not exceed 100:1 or be lower than 1:2, and preferably should be in the range of from 50:1 to 2:1.

It is possible in accordance with the preferred practice of this invention to effect a substantially complete separation of the isophthalic acid and terephthalic acid in only two operations. In such case the amount of sulfuric acid at any desired concentration and temperature within the previously disclosed ranges is just sufficient to entirely dissolve the isophthalic acid present in the mixture to be separated. This amount of sulfuric acid is simply determined, for example, by forming an intimate mixture of the desired sulfuric acid and as much isophthalic acid as will be retained in solution at the desired temperature for carrying out the initial separation. An aliquot portion of the sulfuric acid saturated with isophthalic acid may then be analyzed by diluting the solution to some concentration and/or by cooling to some lower temperature within the previously disclosed ranges, and measuring the amount of isophthalic acid thus obtained as precipitate. From the amount of isophthalic acid thus determined to be held in solution by the sulfuric acid at the temperature of operation, the total amount of a particular sulfuric acid and the temperature just sufficient to entirely dissolve all of the isophthalic acid in any amount of mixture may be readily calculated.

The separations of the solid phases and the liquid phases formed in the process of this invention are conveniently carried out by any of the commercially known methods of separating solids from liquids. Such methods may involve sedimentation including the use of continuous rotating thickeners and centrifuges. For present purposes filtration with vacuum or centrifuge has been found to be a very practical means of separation. Decantation may be resorted to if complete phase separation is not required.

Following the separation steps, the liquid phase containing the sulfuric acid may be purified by dilution to precipitate out the more soluble orthophthalic acid, benzoic acid, toluic acids, etc., which may have been present in the original crude starting mixture of isophthalic acid and terephthalic acid. The diluted sulfuric acid may then be concentrated for reuse in the present process or diverted to other processes where dilute sulfuric acid is desired. In a particularly desirable combination, the dilute sulfuric acids obtained in the present process may be employed in the ammonium sulfate oxidation of crude meta- and para-xylene mixtures, as disclosed in my copending application Serial No. 202,389, filed December 22, 1950, to produce additional mixtures of isophthalic and terephthalic acid suitable for separation in accordance with the present process.

Although it is believed that the practice of the present invention will be clear to one skilled in the art from the foregoing discussion, the following simplified examples are offered as further illustration. Unless otherwise specified, the proportions given are on a weight basis.

Example 1

10 parts of a mixture of isophthalic acid and terephthalic acid, analyzing 84.5% iso- and 15.5% tere-, were agitated with 184 parts of 96% sulfuric acid at room temperature for about one hour. The resultant slurry was then filtered through a fritted glass funnel. The filter cake was washed with 40 parts of water and dried to give 1.46 parts of phthalic acids which analyzed 20% isophthalic acid and 80% terephthalic acid by ultraviolet spectrum analysis.

The phthalic acid fraction obtained in the above separation was reagitated with another 36.8 parts of 96% sulfuric acid. The slurry thus formed was filtered and washed with water to give 95% pure terephthalic acid.

The filtrate or liquid phase of the first separation step above was diluted with 7 parts of water to give a sulfuric acid concentration of about 93%. A white precipitate was thus obtained which, after filtering, washing, and drying, yielded 3.82 parts of 100% pure isophthalic acid. Further dilution of the filtrate with another 7 parts of water to give a sulfuric acid concentration of about 89% precipitated an additional 4.06 parts of 100% pure isophthalic acid. Further dilution of the sulfuric acid filtrate failed to precipitate additional phthalic acid.

A total recovery of 95.5% by weight of the phthalic acids in the starting mixture was obtained in the above separations.

Example 2

Twenty grams of an 84.5/15.5 iso-terephthalic acid mixture were added to 460 cc. of 80% sulfuric acid in a flask fitted with a reflux condenser and the slurry heated to 400° F. with stirring, at which temperature everything dissolved. The temperature was then dropped to 340° F. and some acid crystallized from solution. The slurry was filtered rapidly through a filter stick, at 340° F., and the filtrate chilled to room temperature, and refiltered. The isophthalic acid cake from the cold acid filtration (enriched by removal of the less soluble terephthalic acid) after washing and drying, weighed 15.9 grams and was found to contain an 88.3/11.7 iso-terephthalic acid mixture. The cake from the hot filtration, after washing and drying, weighed 3.6 grams. Since the theoretical terephthalic acid in the original mixture would be 3.1 grams, it was evident the 3.6 grams could not be just terephthalic acid, so it was reslurried with 100 cc. of the cold filtrate acid, and heated to 300° F. to obtain a further separation, and filtered. The cake was washed and dried. It now weighed 2.4 grams and consisted of a 44/56 iso-terephthalic acid mixture. The filtrate from this filtration was cooled to room temperature and refiltered to give a cake which when washed and dried weighed 1.0 grams and analyzed as 89.4/10.6 iso-terephthalic acid. The total acid recovered in this way was 19.3 grams, or 96.5% of that charged. Sulfuric acid filtrates were combined for re-use, and amounted to 430 cc.

I claim:

1. A process for separating mixtures of isophthalic acid and terephthalic acid which comprises forming an intimate mixture of the acids with aqueous sulfuric acid having a concentration of at least 70 weight per cent, said mixture being at a temperature of at least 50° F., and separating a solid phase and a liquid phase from the intimate mixture.

2. A process for separating mixtures of isophthalic acid and terephthalic acid which comprises forming an intimate mixture of the acids with aqueous sulfuric acid having a concentration of at least 70 weight per cent, said mixture being at a temperature of at least 50° F., separating from the intimate mixture a solid phase richer in terephthalic acid than the original mixture and a liquid phase consisting of an aqueous sulfuric acid solution of a phthalic acid mixture richer in isophthalic acid than the original mixture, crystallizing from said liquid phase the aforesaid isophthalic acid enriched mixture.

3. A process for separating mixtures of isophthalic acid and terephthalic acid which comprises forming an intimate mixture of the acids with aqueous sulfuric acid having a concentration of at least 70 weight per cent, said mixture being at a temperature of at least 50° F., and said aqueous sulfuric acid being in an amount at least sufficient to dissolve all of the isophthalic acid, and separating a solid phase and a liquid phase from the intimate mixture, said solid phase being substantially pure terephthalic acid.

4. A process for separating mixtures of isophthalic acid and terephthalic acid which comprises forming an intimate mixture of the acids with aqueous sulfuric acid having a concentration of at least 70 weight per cent, said mixture being at a temperature of at least 50° F., and said aqueous sulfuric acid being in an amount insufficient to dissolve all of the isophthalic acid, and separating a solid phase and a liquid phase from the intimate mixture, said liquid phase being an aqueous sulfuric acid solution of substantially pure isophthalic acid.

5. A process for separating mixtures of isophthalic acid and terephthalic acid which comprises forming an intimate mixture of the acids with aqueous sulfuric acid having a concentration of at least 70 weight per cent, said mixture being at a temperature of at least 50° F., said aqueous sulfuric acid being in an amount sufficient to form a saturated solution of all the isophthalic acid present, and separating a solid phase and a liquid phase from the intimate mixture, said solid phase being substantially pure terephthalic acid and said liquid phase being an aqueous sulfuric acid solution of substantially pure isophthalic acid.

6. A process for separating mixtures of isophthalic acid and terephthalic acid which comprises forming an intimate mixture of the acids with aqueous sulfuric acid having a concentration of about 96% by weight, said mixture being at about 65° F. and the weight ratio of said aqueous sulfuric acid to the phthalic acid mixture being between 2:1 and 50:1, separating a solid phase consisting of a phthalic acid mixture enriched in terephthalic acid and a liquid phase consisting of an aqueous sulfuric acid solution of a phthalic acid mixture enriched in isophthalic acid, diluting said liquid phase with water to a sulfuric acid concentration of about 89%, separating and recovering a solid phase consisting of the aforesaid isophthalic acid enriched mixture.

7. A process for separating mixtures of isophthalic acid and terephthalic acid which comprises forming an intimate mixture of the acids with aqueous sulfuric acid having a concentration of about 80% by weight, said mixture being at about 300° F. and the weight ratio of said aqueous sulfuric acid to the phthalic acid mixture being between 2:1 and 50:1, separating a solid phase consisting of a phthalic acid mixture enriched in terephthalic acid and a liquid phase consisting of an aqueous sulfuric acid solution of a phthalic acid mixture enriched in isophthalic acid, cooling said liquid phase to about room temperature, separating and recovering a solid phase consisting of the aforesaid isophthalic acid enriched mixture.

8. A process for separating mixtures of isophthalic acid and terephthalic acid which comprises forming an intimate mixture of the acids with aqueous sulfuric acid having a concentration of at least about 80 per cent by weight, said mixture being at a temperature of from about 65° F. to about 500° F., the higher temperatures being employed with the lower concentrations, and said aqueous sulfuric acid being in an amount sufficient to form a saturated solution of a substantial portion of the isophthalic acid present, separating a solid phase consisting of a phthalic acid mixture enriched in terephthalic acid and a liquid phase consisting of an aqueous sulfuric acid solution of a phthalic acid mixture enriched in isophthalic acid, diluting said liquid phase with water to a sulfuric acid concentration of from about 50 to about 100% by weight and cooling it to a temperature of from about 0° F. to about 500° F., the higher temperatures being employed with the lower concentrations, separating and recovering a solid phase consisting of the aforesaid isophthalic acid enriched mixture.

9. A process for separating mixtures of isophthalic acid and terephthalic acid which comprises forming an intimate mixture of the acids with aqueous sulfuric acid having a concentration of at least about 80 per cent by weight, said mixture being at a temperature of from about 65° F. to about 500° F., the higher temperatures being employed with the lower concentrations, and said aqueous sulfuric acid being in an amount sufficient to form a saturated solution of a substantial portion of the isophthalic acid present, separating a solid phase consisting of a phthalic acid mixture enriched in terephthalic acid and a liquid phase consisting of an aqueous sulfuric acid solution of a phthalic acid mixture enriched in isophthalic acid, diluting said liquid phase with water to a sulfuric acid concentration of from about 50 to about 100% by weight, separating and recovering a solid phase consisting of the aforesaid isophthalic acid enriched mixture.

10. A process for separating mixtures of isophthalic acid and terephthalic acid which comprises forming an intimate mixture of the acids with aqueous sulfuric acid having a concentration of from about 85 to about 96 per cent by weight, said mixture being at a temperature of from about 65° F. to about 500° F., the higher temperatures being employed with the lower concentrations, and said aqueous sulfuric acid being in an amount sufficient to form a saturated solution of a substantial portion of the isophthalic acid present, separating a solid phase consisting of a phthalic acid mixture enriched in terephthalic acid and a liquid phase consisting of an aqueous sulfuric acid solution of a phthalic acid mixture enriched in isophthalic acid, cooling said liquid phase to a temperature of from about 0° F. to about 500° F., separating and recovering a solid phase consisting of the aforesaid isophthalic acid enriched mixture.

References Cited in the file of this patent

UNITED STATES PATENTS

| Number | Name | Date |
| --- | --- | --- |
| 2,569,440 | Agnew et al. | Oct. 2, 1951 |
| 2,572,575 | Shafer et al. | Oct. 23, 1951 |